US012675024B2

(12) United States Patent
Garcia et al.

(10) Patent No.: US 12,675,024 B2
(45) Date of Patent: Jul. 7, 2026

(54) SYSTEMS AND METHODS FOR OPTICAL PULSE SHAPING THROUGH NONLINEAR MIXING

(71) Applicants: The Regents of the University of California, Oakland, CA (US); The Board of Trustees of the Leland Stanford Junior University, Stanford, CA (US); Colorado School of Mines, Golden, CO (US)

(72) Inventors: Sergio Carbajo Garcia, Los Angeles, CA (US); Randy Lemons, Boulder Creek, CA (US); Charles Durfee, Eldorado Springs, CO (US)

(73) Assignees: The Regents of the University of California, Oakland, CA (US); The Board of Trustees of the Leland Stanford Junior University, Stanford, CA (US); Colorado School of Mines, Golden, CO (US)

( * ) Notice: Subject to any disclaimer, the term of this patent is extended or adjusted under 35 U.S.C. 154(b) by 359 days.

(21) Appl. No.: 18/410,944

(22) Filed: Jan. 11, 2024

(65) Prior Publication Data

US 2024/0231182 A1    Jul. 11, 2024

Related U.S. Application Data

(60) Provisional application No. 63/479,526, filed on Jan. 11, 2023.

(51) Int. Cl.
G02F 1/35 (2006.01)
G02F 1/355 (2006.01)

(52) U.S. Cl.
CPC .......... G02F 1/3534 (2013.01); G02F 1/3551 (2013.01)

(58) Field of Classification Search
CPC ..................................................... G02F 1/3534
See application file for complete search history.

(56) References Cited

U.S. PATENT DOCUMENTS

| | | | |
|---|---|---|---|
| 2021/0141282 A1* | 5/2021 | Xu | H04B 10/504 |
| 2023/0094403 A1* | 3/2023 | Pape | H01S 3/1115 |
| | | | 372/25 |
| 2024/0231182 A1* | 7/2024 | Garcia | G02F 1/3551 |

FOREIGN PATENT DOCUMENTS

| | | | |
|---|---|---|---|
| EP | 2051137 A1 * | 4/2009 | G02F 1/39 |

OTHER PUBLICATIONS

Nakamura, Kentaro and F. Kannari. "Pulse shaping of short wavelength femtosecond laser pulses by sum-frequency mixing of two broadband pulses." International Quantum Electronics Conference, 2005. (2005): 77-78. (Year: 2005).*

* cited by examiner

*Primary Examiner* — Rhonda S Peace
(74) *Attorney, Agent, or Firm* — KPPB LLP

(57) ABSTRACT

Systems and methods for shaping temporal and amplitude profiles of optical pulses in accordance with embodiments of the invention are illustrated. One embodiment includes at least two laser emitters where each emitter configured to generate at least two input optical pulses, a pulse-shaping device configured to apply dispersions of different orders on each of the at least two input pulses, and a nonlinear crystal where the at least two input pulses applied with dispersions combine to emit an output optical pulse having an angular frequency that is the sum of the angular frequencies of the at least two input pulses.

34 Claims, 9 Drawing Sheets

SYSTEMS AND METHODS FOR OPTICAL PULSE SHAPING THROUGH NONLINEAR MIXING

CROSS-REFERENCE TO RELATED APPLICATIONS

The current application claims the benefit of and priority under 35 U.S.C. § 119(e) to U.S. Provisional Patent Application No. 63/479,526 entitled "Systems and Methods for Temporal Shaping of Optical Pulses Through Nonlinear Mixing" filed Jan. 11, 2023. The disclosure of U.S. Provisional Patent Application No. 63/479,526 is hereby incorporated by reference in its entirety for all purposes.

STATEMENT OF FEDERAL SUPPORT

This invention was made with government support under DE-AC02-76SF00515 awarded by the U.S. Department of Energy. The government has certain rights in the invention.

FIELD OF THE INVENTION

The present invention generally relates to optics and, more specifically, using sum-frequency generation and dispersion to shape the temporal and amplitude profiles of optical pulses.

BACKGROUND

Optical pulse refers to a flash of light, usually generated using lasers. There is a wide range of techniques for generating optical pulses with durations of nanoseconds, picoseconds, or even femtoseconds using lasers. The short duration of these optical pulses allows the optical pulses to have a variety of uses in different applications including telecommunications and precise measurements.

Sum-frequency generation (SFG) refers to a nonlinear optical process where two input optical pulses at their respective angular frequencies are mixed together to generate an output pulse at a different angular frequency. SFG generally occurs when two input optical pulses pass through a nonlinear crystal material to generate the output pulse, which has an angular frequency that is the sum of the angular frequencies of the two input pulses.

SUMMARY OF THE INVENTION

Systems and methods for shaping temporal and amplitude profiles of optical pulses in accordance with embodiments of the invention are illustrated. One embodiment includes at least two laser emitters where each emitter configured to generate at least two input optical pulses, a pulse-shaping device configured to apply dispersions of different orders on each of the at least two input pulses, and a nonlinear crystal where the at least two input pulses applied with dispersions combine to emit an output optical pulse having an angular frequency that is the sum of the angular frequencies of the at least two input pulses.

In a further embodiment, the laser emitter is an Ytterbium-based laser with a 4 nm full width at half maximum spectral bandwidth.

In still another embodiment, the laser emitter is a photoinjector-based x-ray free electron laser (XFEL) configured to generate electron beams by upconverting ultraviolet (UV) optical lasers using a photoelectric effect.

In a still further embodiment, the input optical pulses have a flat-top profile in time and space.

In yet another embodiment, the orders of dispersions applied to the input optical pulses comprise second order dispersions (SODs) and third order dispersions (TODs).

In a yet further embodiment, the pulse-shaping device comprises a grating compressor and stretcher matched to each other.

In another additional embodiment, both the compressor and stretcher comprise a single 1600 lines/mm grating set at a 51.4° incidence creating an effective grating separation of 384 mm.

In a further additional embodiment, the pulse-shaping device further comprises a chirped volume Bragg grating (CVBG) system.

In another embodiment again, the CVBG imparts 24.75 $ps^2$ SOD and negligible TOD to the input optical pulses.

In a further embodiment again, the CVBG is a transparent optical material comprising a plurality of layers of grating of increasing thickness, wherein each layer of grating functions as a Bragg reflector for a separate wavelength.

In still yet another embodiment, the SODs are applied by reflecting the various spectral components of the input optical pulses at different depths.

In still another additional embodiment, the nonlinear crystal is a type I isotropic crystal.

In a still further additional embodiment, the nonlinear crystal is a β-barium borate (BBO) crystal having a length of 2 mm.

In still another embodiment again, the input optical pulses enter the nonlinear crystal at a crossing angle of 1.5°.

In a yet further additional embodiment, the output optical pulse has an angular frequency that is the difference of the angular frequencies of the at least two input pulses.

In yet another embodiment again, further includes a piano-convex cylindrical lens configured to correct the spatial ellipticity of the output optical pulse.

In a yet further embodiment again, further includes a set of spectral filters to filter the output optical pulse across the entire spectral range of the output optical pulse.

One embodiment includes a method for shaping temporal and amplitude profiles of optical pulses, the method includes generating at least two input optical pulses, applying dispersions of different orders on each of the at least two input pulses, combining the at least two input pulses at a nonlinear crystal, where each of the at least two input pulses enter the nonlinear crystal at designated angles such that the angular frequencies of the at least two input pulses are summed, and emitting an output optical pulse of a desired temporal shape and amplitude profile from the nonlinear crystal.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1A:
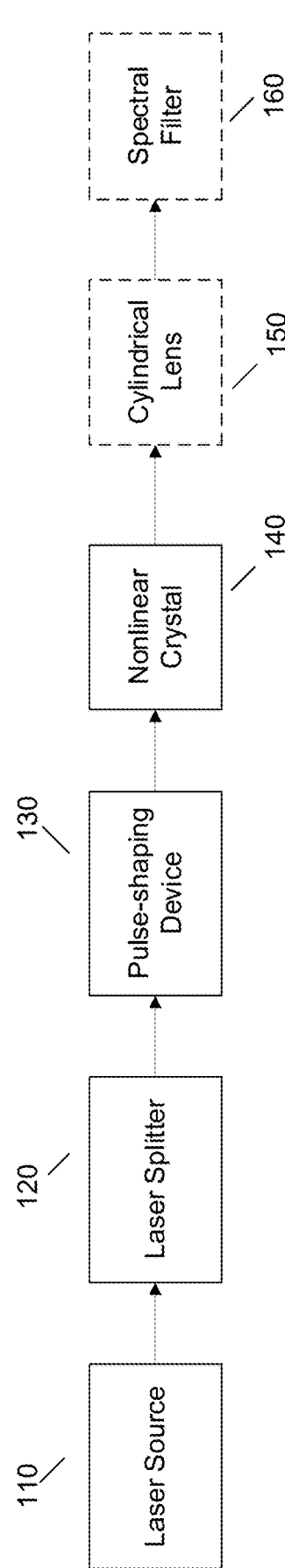
FIGS. 1A and 1B illustrate alternate designs of an overall system architecture for shaping temporal and amplitude profiles of optical pulses in accordance with an embodiment of the invention.

Optical pulse shaping refers to the process of manipulating the intensity and/or phase of light within an optical pulse over time. This is done by manipulating the intensity of the pulse as a function of time. The shape of the pulse can be customized to suit specific applications, such as increasing the signal-to-noise ratio in experiments or achieving precise measurements in telecommunications. Optical pulse shaping is often performed in two ways: temporal shaping and amplitude shaping. Temporal shaping of optical pulses involves modifying the temporal profile of an optical pulse, which is the intensity of the pulse as a function of time. Amplitude shaping, on the other hand, refers to the process of modifying the intensity of the pulse at different points in time.

By shaping the temporal and amplitude profiles of optical pulses, it is possible to control the properties of the light in order to achieve specific effects in various applications. Temporal shaping of optical pulses can provide control of the duration of the pulses and modify the spectral content of the pulses. This may be useful in applications such as ultrafast spectroscopy, where the time resolution of the measurement is critical. Amplitude shaping allows for precise control over the intensity profile of an optical pulse, which can be useful in applications such as optical communication, where the amplitude of the pulse can be used to encode information. In general, shaping the temporal and amplitude profiles of optical pulses can provide greater control over the properties of light and enable a wide range of applications in science, technology, and medicine.

Shaping the profiles of the optical pulses, however, can be difficult to accomplish, especially with optical pulses having extremely short wavelengths, such as picosecond and femtosecond lasers. The narrow spectral bandwidths of high frequency optical pulses require precise control, which can restrict methods that attempt to modify temporal intensity through spectral phase. Direct electronic modulation methods may be limited by the short temporal duration of high frequency optical pulses. Even small variations can result in significant changes to the pulse shape, which can impact the performance of the pulse in different applications. Additionally, the complexity of the optical systems used to generate and manipulate the pulses can also make it challenging to achieve the desired pulse shape.

Systems and methods in accordance with embodiments of the invention can utilize a dispersion-controlled nonlinear synthesis (DCNS) scheme to produce optical pulses with their temporal and amplitude profiles shaped precisely for their intended purposes and being resistant to distortion. In numerous embodiments of the invention, systems and methods can manipulate input optical pulses by adding both second-order dispersion (SOD) and third-order dispersion (TOD) to the input optical pulses. Consider the electric field of a laser in frequency space, which can be represented by:

$$E(\omega) = A(\omega)e^{i\varphi(\omega)}, \tag{1}$$

where $A(\omega)$ is the spectral amplitude and $\varphi(\omega)$ is the spectral phase as a function of angular frequency $\omega$. The spectral amplitude is typically Gaussian in shape, and the spectral phase can generally be described by a Taylor expansion around the central frequency of the field $\omega_0$:

$$\varphi(\omega) = \tag{2}$$
$$\varphi_0 + \varphi_1(\omega - \omega_0) + \frac{\varphi_2}{2!}(\omega - \omega_0)^2 + \frac{\varphi_3}{3!}(\omega - \omega_0)^3 + \frac{\varphi_4}{4!}(\omega - \omega_0)^4 + \dots .$$

The addition of SOD, $\varphi_2$, to an input optical pulse can cause the pulse to chirp, which effectively stretches the input optical pulse by giving a linear order of arrival to the various frequency components of the input optical pulse. The addition of TOD, $\varphi_3$, can add pre or post-pulses to the input optical pulse, as TODs can cause the opposite ends of the spectrum to overlap in time either before or after the main peak. As SODs alone are not tailored for accurate temporal and amplitude shaping, systems and methods in accordance with many embodiments of the invention can leverage the effect of TODs on the input optical pulses to fine-tune input optical pulse shaping such that the input pulses can be used for their intended purposes.

In several embodiments, systems and methods utilize sum frequency generation (SFG) or difference frequency generation (DFG) to mix the dispersion-controlled input optical pulses to produce output optical pulses that have the properly tailored intensity profile for their respective applications. SFG and DFG are nonlinear optical processes where two input pulses at different angular frequencies combine to generate a new output pulse at a new angular frequency that is the sum or difference of the angular frequencies of the input pulses. For optical pulses made up of many photons, this relationship can be probabilistically applied to photon pairs based on the likelihood of nonlinear conversion controlled by the medium in which the mixing occurs and the pulse itself. Systems and methods in accordance with numerous embodiments of the invention can provide a straightforward nonlinear mixing process to generate optical pulses for various applications.

Pulse Shaping System

Figure 1B:
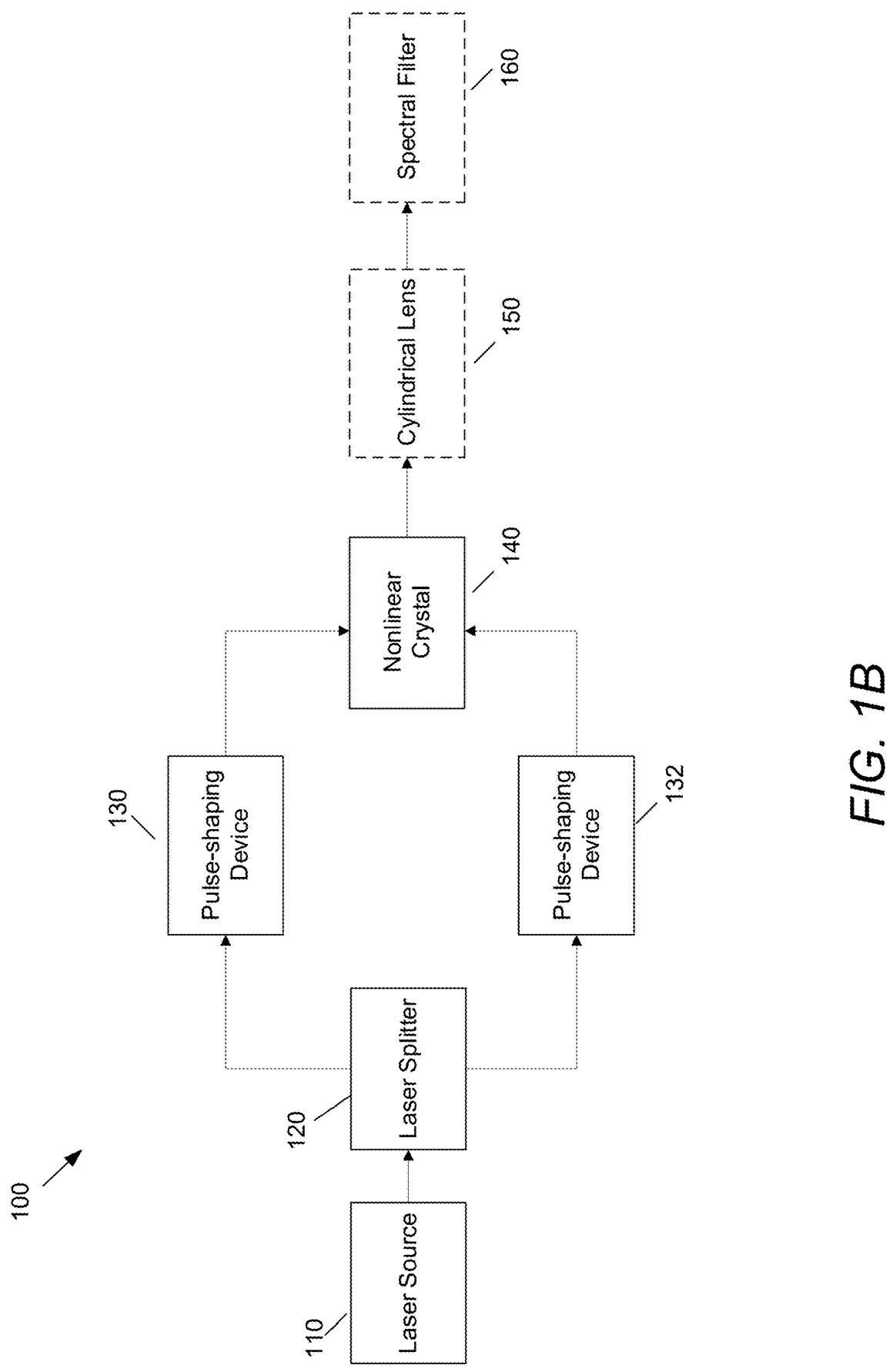

Systems and methods in accordance with many embodiments of the invention can shape optical pulses for various applications. FIGS. 1A and 1B illustrate alternate designs of an overall system architecture for shaping temporal and amplitude profiles of optical pulses in accordance with an embodiment of the invention. Pulse shaping system 100 includes a laser source 110 and a laser splitter 120. Pulse shaping system 100 further includes at least one pulse-shaping device 130, a nonlinear crystal 140, an optional cylindrical lens 150, and an optional spectral filter 160, depending on the application of the generated output.

In some embodiments, the laser splitter splits an input optical pulse generated by the laser source into two optical pulses. In certain embodiments, the pulse-shaping system may only include a single pulse-shaping device, as illustrated in FIG. 1A. In the system architecture illustrated by FIG. 1A, the two input optical pulses may travel to a single pulse-shaping device 130, where the pulse-shaping device can apply dispersions to the two input pulses together. In several embodiments, the pulse-shaping system includes at least two pulse-shaping devices 130 and 132, as illustrated in FIG. 1B. The laser splitter can split the single input optical pulse into two optical pulses. Each optical pulse may be transmitted to each of the two pulse-shaping devices, where each pulse-shaping device can apply dispersions to the input optical pulse.

Pulse shaping system 100 can be configured to generate output optical pulses of different time-intensity profiles for different desired applications. In many embodiments, two input optical pulses are applied with various orders of dispersion and projected at a nonlinear crystal. The dispersed input pulses can be overlapped in time and space at the nonlinear crystal to generate an output optical pulse if the two input pulses are each from a separate driving pulse. In numerous embodiments, the dispersed input pulses undergo sum frequency generation (SFG) or difference frequency generation (DFG) at the nonlinear crystal. In several embodiments of the invention, the laser source is an X-ray free electron laser (XFEL). As faster timescales of reactions and dynamics to the order of attoseconds may be desired to better understand how light interacts with matter, lasers with higher power and higher quality may be utilized. XFELs can be used to study the reactions and dynamics of optical pulses in time and have exceptional capability to probe molecular and atomic dynamics with very good spatial and temporal resolutions. In some embodiments, the XFEL used to perform temporal shaping is the Linac Coherent Light Source (LCLS) at the Stanford Linear Accelerator Center (SLAC) National Accelerator Lab. The LCLS is capable of taking snapshots at ultrafast timescales with atomic resolution. In selected embodiments, the laser source may be an LCLS-II laser consisting of an Ytterbium-based commercial laser that outputs 50 µJ, 330 fs pulses with an approximately 4 nm full width at half maximum (FWHM) spectral bandwidth.

Figure 2:
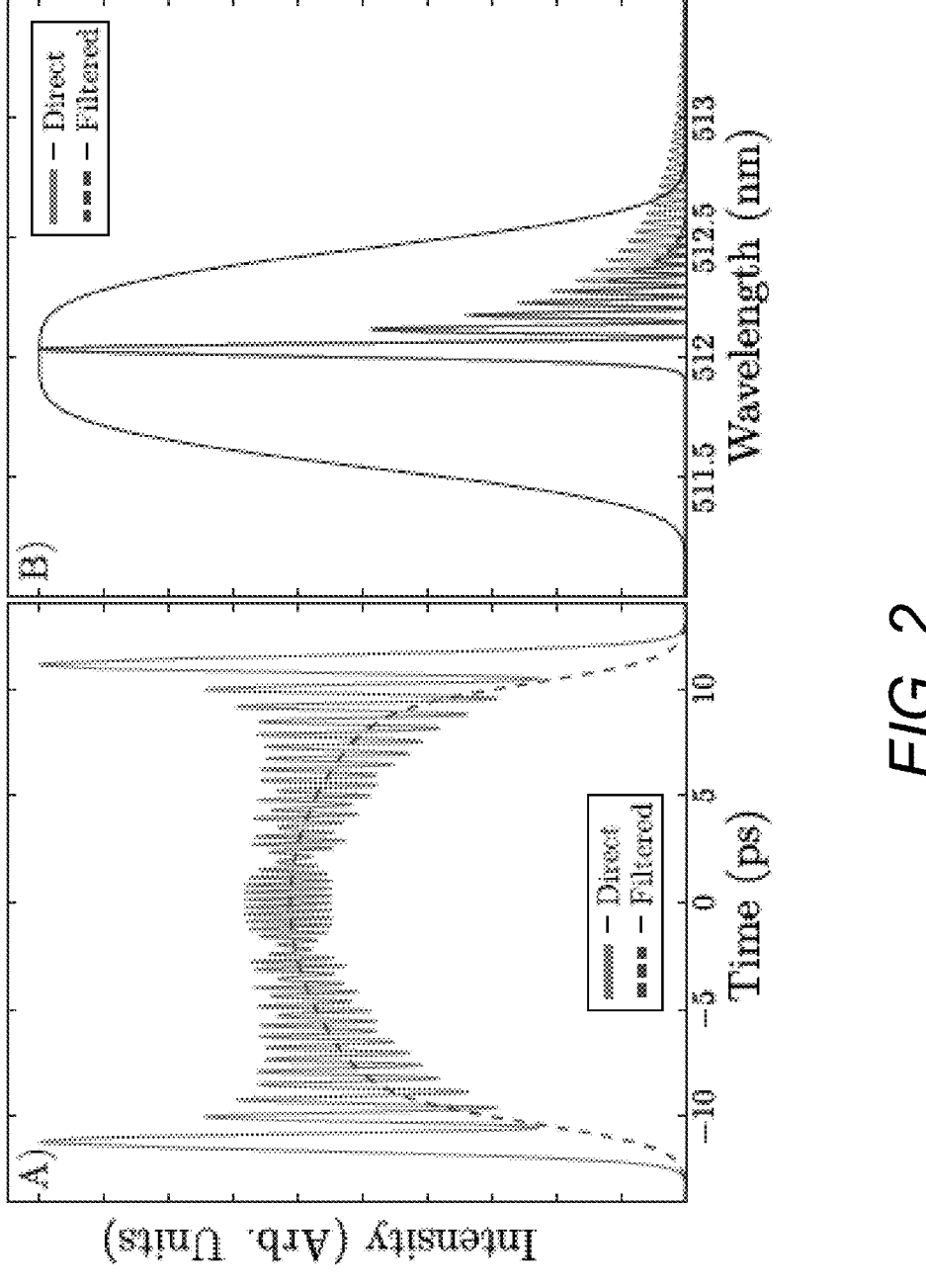
FIG. 2 illustrates a flat-top time-intensity profile for an x-ray free electron laser (XFEL) ultraviolet (UV) output pulse in accordance with an embodiment of the invention.

Laser sources generating XFELs may contain a photoinjector. Photoinjectors generate electron beams (e-beams) through a photoelectric effect on photocathodes using upconverted optical lasers that are usually in the ultraviolet (UV) range. The spatial and temporal intensity profiles of these lasers have been demonstrated to affect e-beam emittance, and thus, pulse shaping can be used to reduce transverse emittance and increase electron brightness. In many embodiments, a UV pulse for XFELs is characterized by a flat-top profile in time and space. FIG. 2 illustrates a flat-top profile of a UV pulse in accordance with an embodiment of the invention. The flat-top profile can lead to a higher quality electron beam by reducing the intra-beam space charge effects of the electron bunches. In other embodiments, the shape of time-intensity profile of output pulses may be different as desired for a particular application. By using different types of input pulses and/or adjusting the settings of the various components of the pulse-shaping system, systems and methods can generate output pulses of other time-intensity profile shapes.

Although a specific example of a laser source is illustrated in this figure, any of a variety of laser sources can be utilized to provide input optical pulses similar to those described herein as appropriate to the requirements of specific applications in accordance with embodiments of the invention.

In many embodiments, dispersions are applied to the input optical pulses through a pulse-shaping device. The pulse-shaping device may be a system made up of a matched grating compressor and stretcher. Both the compressor and stretcher may contain a single 1600 lines/mm grating set at 51.4° incidence with an effective grating separation of 384 mm corresponding to a dispersed optical path length of 745 mm. The pulse-shaping device can be adjusted to suit the requirements of desired pulse shapes. Factors, including but not limited to grating angles, grating separation, and grating groove density, may be adjusted to control the amounts of SOD and TOD applied to the input pulses. A person of ordinary skill in the art will recognize that other gratings, angles, and dispersed optical path lengths may be utilized to impart the proper amount of SOD and TOD appropriate to a particular application. In selected embodiments, the pulse-shaping device further includes a chirped volume Bragg grating (CVBG) system. The optical pulses outputted from the compressor and stretcher may be fed through opposite sides of the CVBG designed to impart 24.75 ps² SOD with negligible TOD to correct for the excessive amount of SOD on the IR pulses. In numerous embodiments, the CVBG is a transparent optic made up of many layers with increasing thickness, each acting as a Bragg reflector for a different wavelength. By passing an optical pulse through the CVBG, the different spectral components can be reflected at different depths achieving a near-ideal SOD effect.

The two input optical pulses with dispersion applied may be used as inputs to be focused through a lens and projected into a nonlinear crystal. In numerous embodiments, nonlinear SFG or DFG utilizing highly dispersed pulses are used to generate a pulse at the nonlinear crystal with tunable temporal profiles in duration and shape, where the generated pulse can be directly used in further nonlinear conversion processes without distortion of the temporal distribution. Type I isotropic crystals can be used as the nonlinear crystal for mixing the input optical pulses. In selected embodiments, the nonlinear crystal is a 2 mm β-barium borate (BBO) crystal tuned for type I frequency double of 1024 nm. The crossing angle of the two beams in the nonlinear crystal may be set to approximately 1.5°, and determined by the lateral separation between the nonlinear crystal and the single lens also used to focus them in the crystal. In some embodiments, nonlinear crystals capable of generating narrowband harmonic signals can be used to generate higher harmonics and output optical pulses of more wavelengths. A person of ordinary skill in the art will recognize that other type I nonlinear crystals, lengths of crystals, and tuning may be utilized as determined by the frequency mixing type and involved optical angular frequencies.

The resulting output pulse emitted out from the nonlinear crystal after the application of SFG or DFG may display a large amount of spatial ellipticity due to the overlap region of the two circular beams also being elliptical. However, this can be corrected by passing the output pulse through the optional cylindrical lens set along the axis. In selected embodiments, the cylindrical lens may be a piano-convex or piano-concave cylindrical lens. In many embodiments, the output pulse is further sent through two spectral filters with a central wavelength of 514 nm and a full width and half maximum (FWHM) of 2 nm. This central wavelength can allow for variable filtering across the entirety of the spectral range, as the effective central wavelength is a function of the angle of incidence. The two spectral filters can be angle-tuned towards 512.5 nm and 511.5 nm such that the combined effective filter is centered at 512 nm but with a FWHM of approximately 1 nm. In some embodiments, the SFG pulse emitted from the spectral filters is used to generate the desired UV pulse in a 1.5 mm BBO crystal.

Although a specific example of pulse-shaping system architecture is illustrated in this figure, any of a variety of system architectures can be utilized to shape the temporal and amplitude profiles of optical pulses similar to those described herein as appropriate to the requirements of specific applications in accordance with embodiments of the invention.

Using Dispersion for Shaping

DCNS may control the spectral phase, or chirp, of the input optical pulses in order to shape the temporal profile of the resulting pulse after nonlinear mixing. In numerous embodiments, dispersion is applied to input optical pulses using a pulse-shaping device to control the shape of the pulse and optimize the output pulse. Adding dispersion to a pulse causes it to chirp. When the chirped pulse is positive, the higher frequency components of the pulse lag behind the lower frequency components. When the chirped pulse is negative, the opposite occurs where the higher frequency components lead and the lower frequency components lag. As a result of either case, the pulse's energy is spread out over time.

Figure 3:
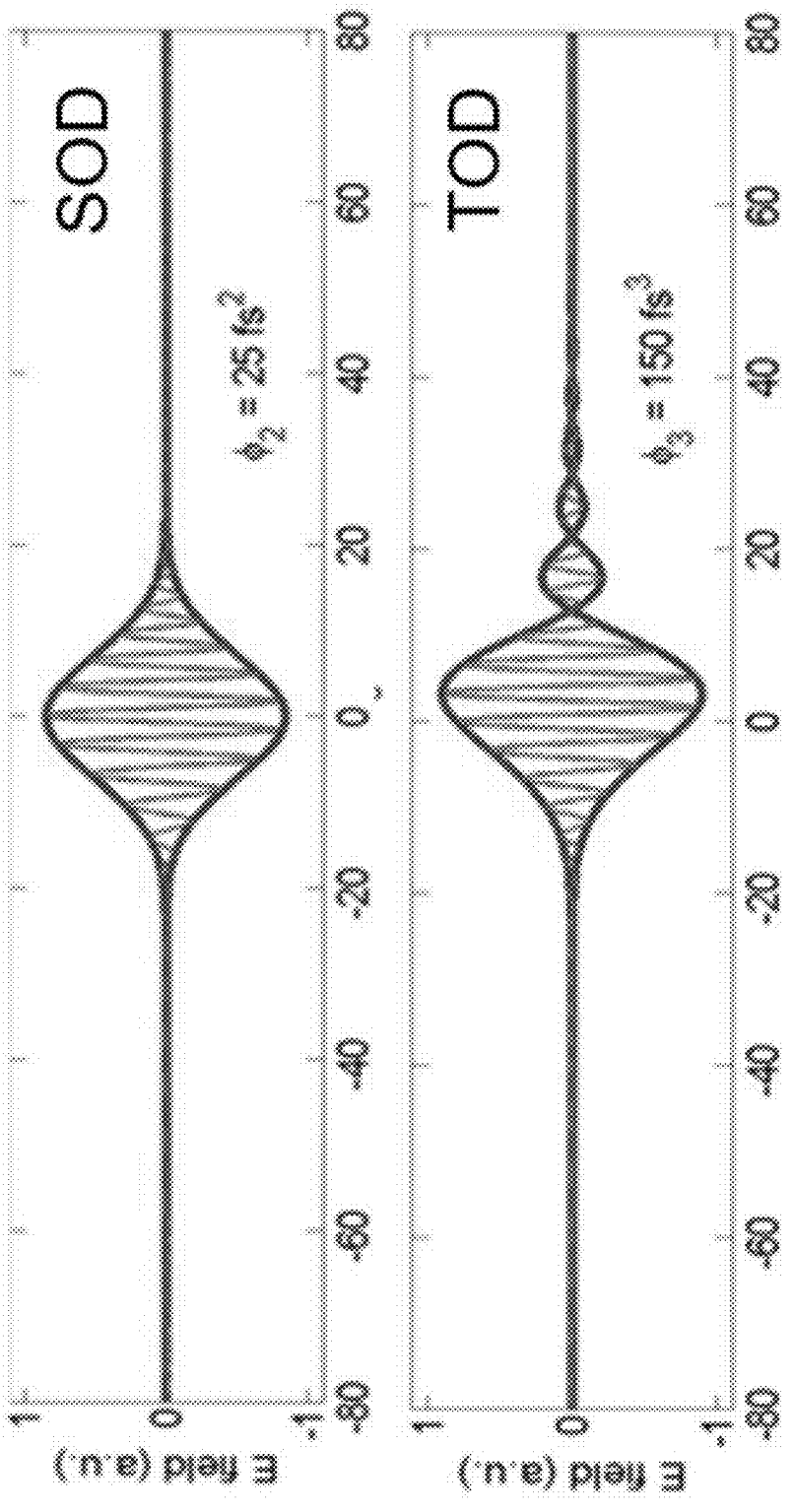
FIG. 3 illustrates the effects second order dispersion (SOD) and third order dispersion (TOD) have on an input pulse in accordance with an embodiment of the invention.

In many embodiments, two types of dispersion are controlled and applied to the input optical pulses: second-order dispersion (SOD) and third-order dispersion (TOD). SOD and TOD refer to the terms in the Taylor series of the spectral phase of an optical pulse, with even orders of the spectral phase primarily affecting pulse duration and odd orders primarily modulating the pulse in the time domain. FIG. 3 illustrates the effects SOD and TOD have on an input pulse in accordance with an embodiment of the invention. SOD is a quadratic phase that gives a linear ordering to the arrival time of the frequency components, stretching the duration of the pulse. TOD results from the cubic phase, where the opposite ends of the spectrum overlap in time either before or after the main peak, leading to characteristic beating or temporal fringes. In other words, SOD is responsible for stretching the width of the pulse, which is the duration of the pulse, and TOD is responsible for controlling the shape of the pulse, including the sharpness of the leading or trailing edge and ringing in the field on the opposing edge.

The magnitude and sign of the SOD and TOD applied to each pulse may vary based on the particular application. Applying SOD in equal magnitude but opposite sign to the two input pulses can result in a generated output pulse having the duration of the two input pulses but with drastically reduced spectral width and flat phase. The reduced spectral width derives from the fact that in an optical pulse dispersed with SOD, the frequency components are dispersed in time and can, approximately, be found at only a single smaller moment within the total pulse duration. The flat phase results from the phases of the input pulses being equal and opposite, and are cancelled out when added together through SFG.

Application of TOD to the input pulses can cause the input pulses to have sharper rise or fall times that are controlled by the sign. The magnitude and sign of the applied TOD may similarly be dependent upon the particular application. If the applied TOD is equal and opposite to the input pulse, the temporal profile of the generated pulse approaches a rectangular shape. If the applied TOD is equal, but in the same sign as the input pulse, then a triangular temporal profile is generated. In many embodiments, temporal profiles may be adjusted by mixing the SOD and TOD in varying amounts with durations of the pulses controlled by the magnitude of the dispersion. Additionally, pulses generated by this method often have undesired beating in the temporal profile. In numerous embodiments, this beating can be reduced or eliminated by applying spectral bandpass filters to the generated pulse to produce a profile more closely resembling the desired shape. The width of these filters may be dependent on the applied dispersions and initial spectral bandwidths.

In some embodiments, the input optical pulses are a combination of two equal-energy transform-limited Gaussian pulses overlapped in time. The phase of each pulse can be adjusted separately by multiplying with Equation 2 in the frequency space, where $\varphi_2$ and $\varphi_3$ are free parameters, and higher-order terms may be ignored. These tailored pulses are the two initial fields, $A_1$ and $A_2$, used in solving the coupled equations for sum frequency generation:

$$\frac{dA_1}{dz} = \frac{2id_{eff}\omega_1^2}{k_1 c^2} A_2^* A_3 e^{-i\Delta kz}, \tag{3}$$

$$\frac{dA_2}{dz} = \frac{2id_{eff}\omega_2^2}{k_2 c^2} A_1^* A_3 e^{-i\Delta kz},$$

$$\frac{dA_3}{dz} = \frac{2id_{eff}\omega_3^2}{k_3 c^2} A_1 A_2 e^{i\Delta kz}.$$

Propagation and frequency mixing can be processed using a symmetrized split-step Fourier method along with a fourth order Runga-Kutta algorithm to solve the coupled non-linear equations. Nonlinear conversion and nonlinear index effects may be processed in the time and position domains while propagation and dispersion through the crystal may be processed in the temporal and spatial frequency domain.

Figure 4:
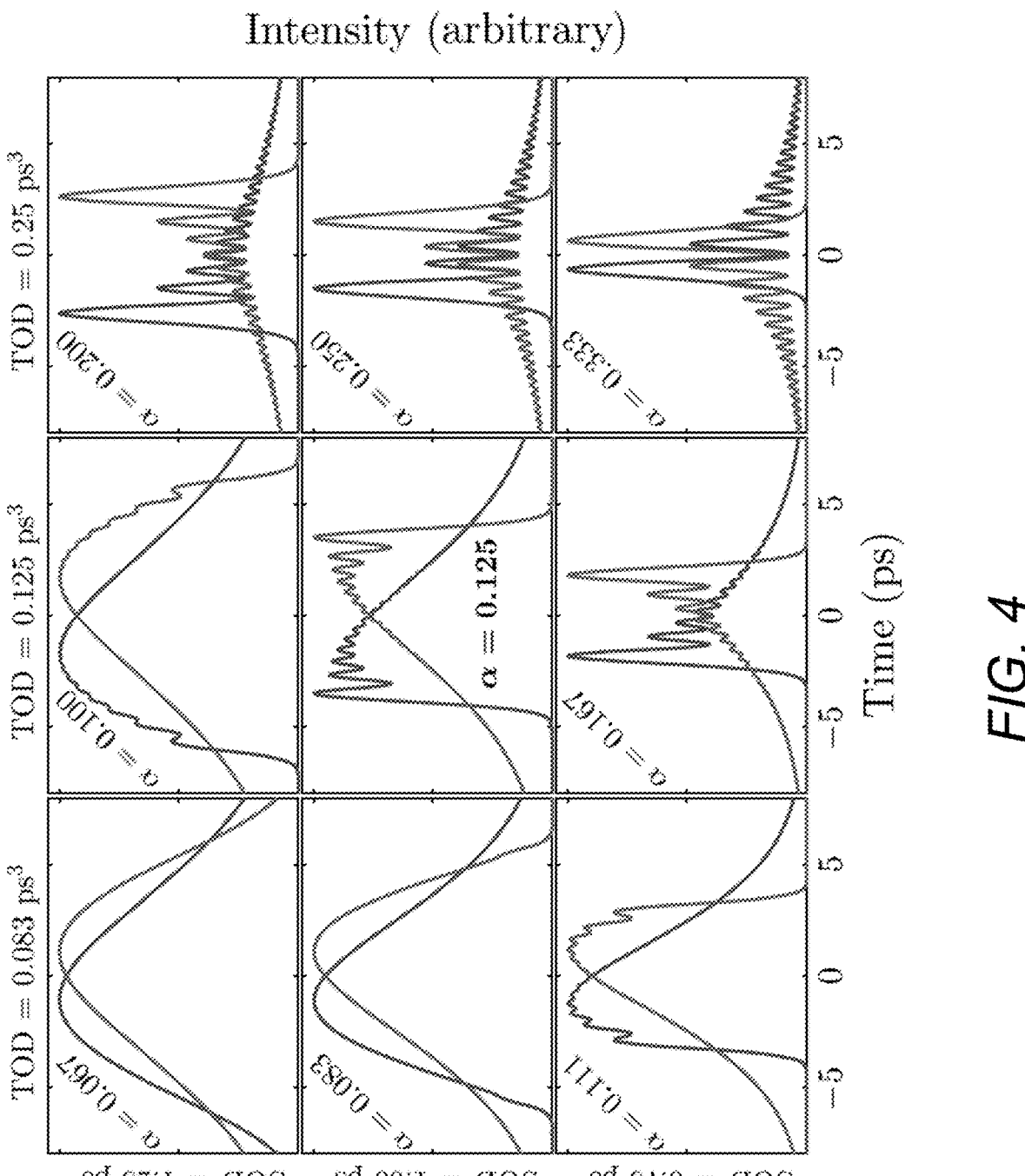
FIG. 4 illustrates the pulse envelopes resulting from different combinations of SOD and TOD applied to input optical pulses in accordance with an embodiment of the invention.

As discussed above, SOD primarily controls duration, and TOD controls the sharpness of the leading or trailing edge and ringing in the field on the opposing edge. FIG. 4 illustrates the pulse envelopes resulting from different combinations of SOD and TOD applied to input optical pulses in accordance with an embodiment of the invention. Each column has the same magnitude of the TOD value at the top and each row has the same magnitude of SOD. The interplay between SOD and TOD illustrated in FIG. 4 can determine the pulse duration and the shape. By defining the ratio between TOD and SOD, $$\alpha = \frac{\varphi_3/ps^3}{\varphi_2/ps^2}, \tag{4}$$

a single parameter $\alpha$ can be obtained to describe the general shape of a shaped pulse that is approximately invariant to the pulse duration. Optical pulses may be adjusted to produce pulses that can have a sharp rise time, long pulse duration, and narrow bandwidth.

In an example setup using the LCLS-II as the laser source emitting 10 s of picosecond flat-top photoinjector laser pulse, the magnitude of $\alpha$ being close to 0.125 ps can result in the signal and idler pulses having temporal symmetry with equal and opposite amounts of SOD and $\alpha=-0.128$ ps. The initial value of SOD ($\approx 3.5$ ps$^2$) was chosen so that the FWHM of the 515 nm pulse would be 25 ps in time.

According to Equation 4, larger amounts of SOD may require a large amount of TOD to maintain α. This can be achieved by passing the transform-limited pulses through a matched compressor-stretcher set with gratings detuned from the Littrow angle. To maintain grating efficiency, a larger amount of SOD and an appropriate amount of TOD may be generated first. SOD can be gradually reduced to desired levels afterward with highly dispersive optics, such as chirped volume Bragg gratings, to obtain the optimal α.

In many embodiments, once the half-pulse fields are constructed from the given phase parameters, they are propagated with the split-step method through β barium borate with the crystal angle tuned for type I sum mixing and a 2 mm crystal length. The crossing angle can be set to 1.5 deg. The crossing angle is generally designed to be sufficiently large to allow the sum-frequency signal to be separated from the two input beams and suppress intra-beam second harmonic generation (SHG), but not too large such that the spatial overlap of the beams in the crystal is reduced. Additionally, back-conversion from 515 to 1030 nm may require adjustments to reduce distortion to the temporal and spectral profiles.

In this example setup, the output pulse has a sharp rise time and a flatter profile than the traditionally used Gaussian pulses with upward of 65% conversion efficiency. The output pulse in this example is also characterized by large and rapid amplitude fluctuations on the picosecond scale that can be detrimental to e-beam emittance. These fluctuations, such as the larger oscillations at the edges may be the result of coherent interaction between the main spectral peak and interference from the higher wavelengths in the asymmetric tail. However, by applying a spectral amplitude filter after conversion that is significantly wider than the FWHM of the pulse's spectral bandwidth, the high-frequency components can be attenuated without a major efficiency penalty. In this case, by employing a second order super-Gaussian spectral filter with 1/e width of 0.5 nm, such as a Bragg grating interference filter, the total power in the field is reduced by less than 10% and results in a smoother temporal profile. The thickness of the nonlinear crystal for the doubling step from 515 to 257 nm can be chosen to filter the bandwidth through phase mismatch.

This above approach of using a combination of SOD and TOD to shape optical pulses can be further extended to shape the amplitude profiles of optical pulses. In many embodiments, amplitude shaping is performed by introducing spectral amplitude attenuation of the input pulses before the SFG process at the nonlinear crystal. Spectral amplitude attenuation refers to decreasing the relative power of the individual spectral components of the broadband input pulse relative to other spectral components within the same pulse. By decreasing the relative power of certain spectral components, the available mixing products between the two input pulses in the SFG process can be changed, resulting in additional control over the tailored SFG pulse temporal intensity profile on top of a baseline profile achieved with a certain combination of SOD and TOD. Spectral amplitude attenuation can be applied to one or multiple of the input pulses and can be done in a fixed or programmable fashion. A person of ordinary skill in the art will recognize that the exact degree of spectral amplitude attenuation such as the magnitude and position of attenuation within the bandwidth of each input pulse is application-dependent.

One example of attenuation that may be used for amplitude shaping is to introduce a small region of no spectral power within the full bandwidth of the input pulses, which can introduce fluctuations to the SFG pulse on top of a given SOD+TOD shaping solution. This can effectively combine both temporal and amplitude shaping of input pulses, and generate an output optical pulse for an intended purpose. As amplitude shaping seeks to adjust input optical pulses and fine-tune depending on the desired application, in many embodiments, amplitude shaping can be used to tune the laser source. Amplitude shaping may be used for adaptive tuning of the laser source to obtain the desired profile of the output pulse.

Figure 5:
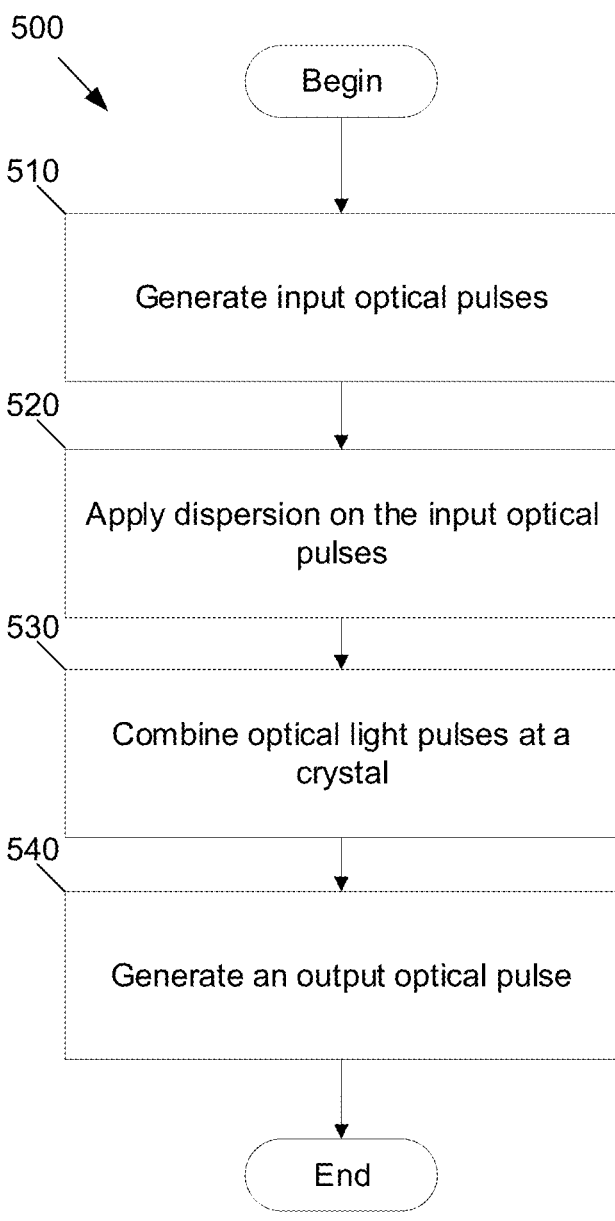
FIG. 5 conceptually illustrates a process for shaping the temporal and amplitude profiles of optical pulses in accordance with an embodiment of the invention.

A process for shaping the temporal and amplitude profiles of optical pulses in accordance with an embodiment of the invention is illustrated in FIG. 5. Process 500 generates (510) input optical pulses. Input optical pulses can be generated using, for example, an X-ray free electron laser (XFEL), as discussed further above. In some embodiments, the input optical pulses may be generated using an Linac Coherent Light Source-II (LCLS-II) laser consisting of an Ytterbium-based commercial laser that outputs 50 μJ, 330 fs pulses with an approximately 4 nm full width at half maximum (FWHM) spectral bandwidth. In many embodiments, at least two input pulses are generated.

Process 500 applies (502) dispersion on the input optical pulses. Dispersion can be applied using, for example, pulse-shaping devices made up of a matched grating compressor and stretcher as discussed further above. As discussed further above, at least second-order dispersion (SOD) and third-order dispersion (TOD) can be applied to the input optical pulses in accordance with several embodiments.

Process 500 combines (530) the input optical pulses at a crystal. As discussed further above, several embodiments utilize a method of nonlinear sum frequency generation (SFG) that uses highly dispersed pulses to generate a pulse at the nonlinear crystal with tunable temporal profiles in duration and shape, where the generated pulse can be directly used in further nonlinear conversions processes without distortion of the temporal distribution. The crossing angle of the two beams in the nonlinear crystal can be determined by the lateral separation between the nonlinear crystal and a single lens that is used to focus the input optical pulses at the crystal.

Process 500 emits (540) an output optical pulse from the crystal. As discussed further above, the output optical pulse can be passed through a piano-convex/plano-concave cylindrical lens set along the axis. The output pulse In additional embodiments, the output pulse is further sent through two spectral filters.

While specific processes for shaping the temporal and amplitude profiles of optical pulses are described above, any of a variety of processes can be utilized to shape the temporal and amplitude profiles of optical pulses as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Results

Figure 6:
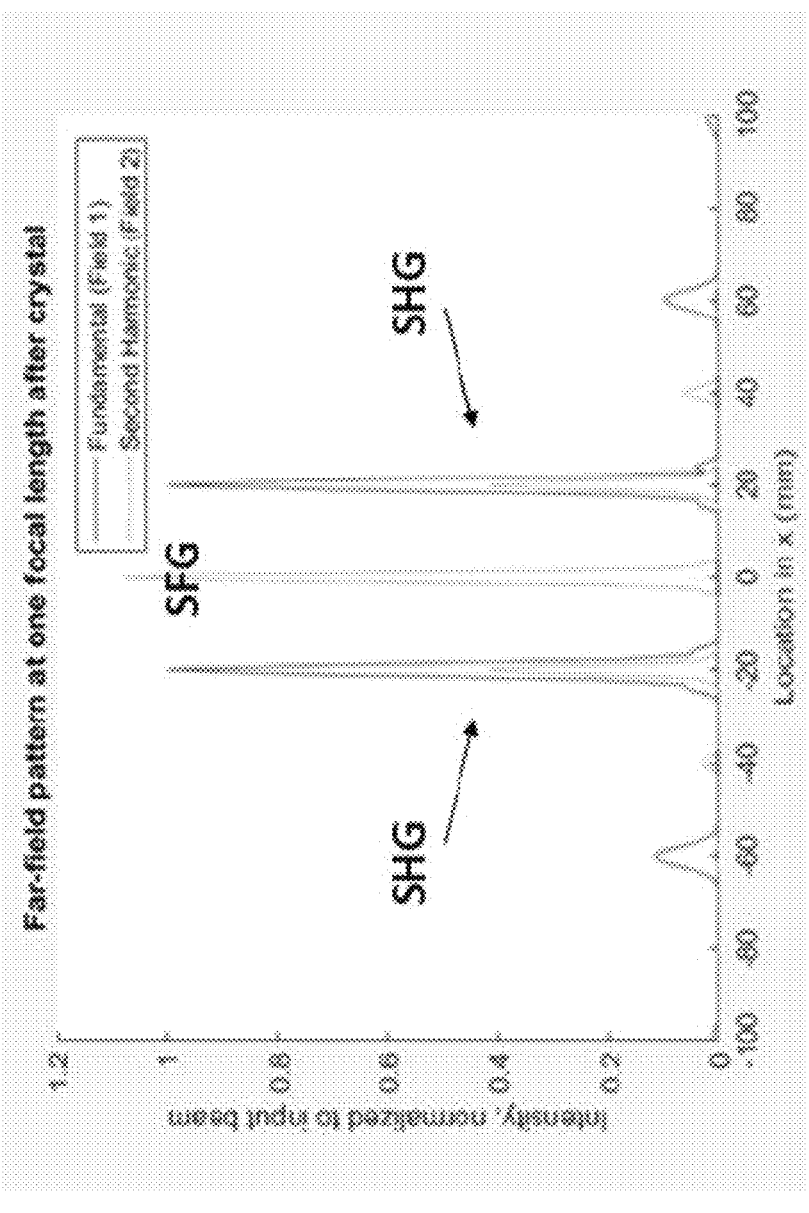
FIG. 6 illustrates a far-field pattern of the output pulses at one focal length in accordance with an embodiment of the invention.

FIG. 6 illustrates a far-field pattern of the output pulses at one focal length in accordance with an embodiment of the invention. At the fundamental electric field, the pulses do not mix, therefore, the two beams are projected as two high-intensity peaks. At the second harmonic electric field, nonlinear conversions can occur. The central peak is produced as a result of the two pulses mixing with each other under SFG. The two lower intensity peaks on either side represent second harmonic generation (SHG), which is the result of each pulse mixing with itself.

Figure 7A:
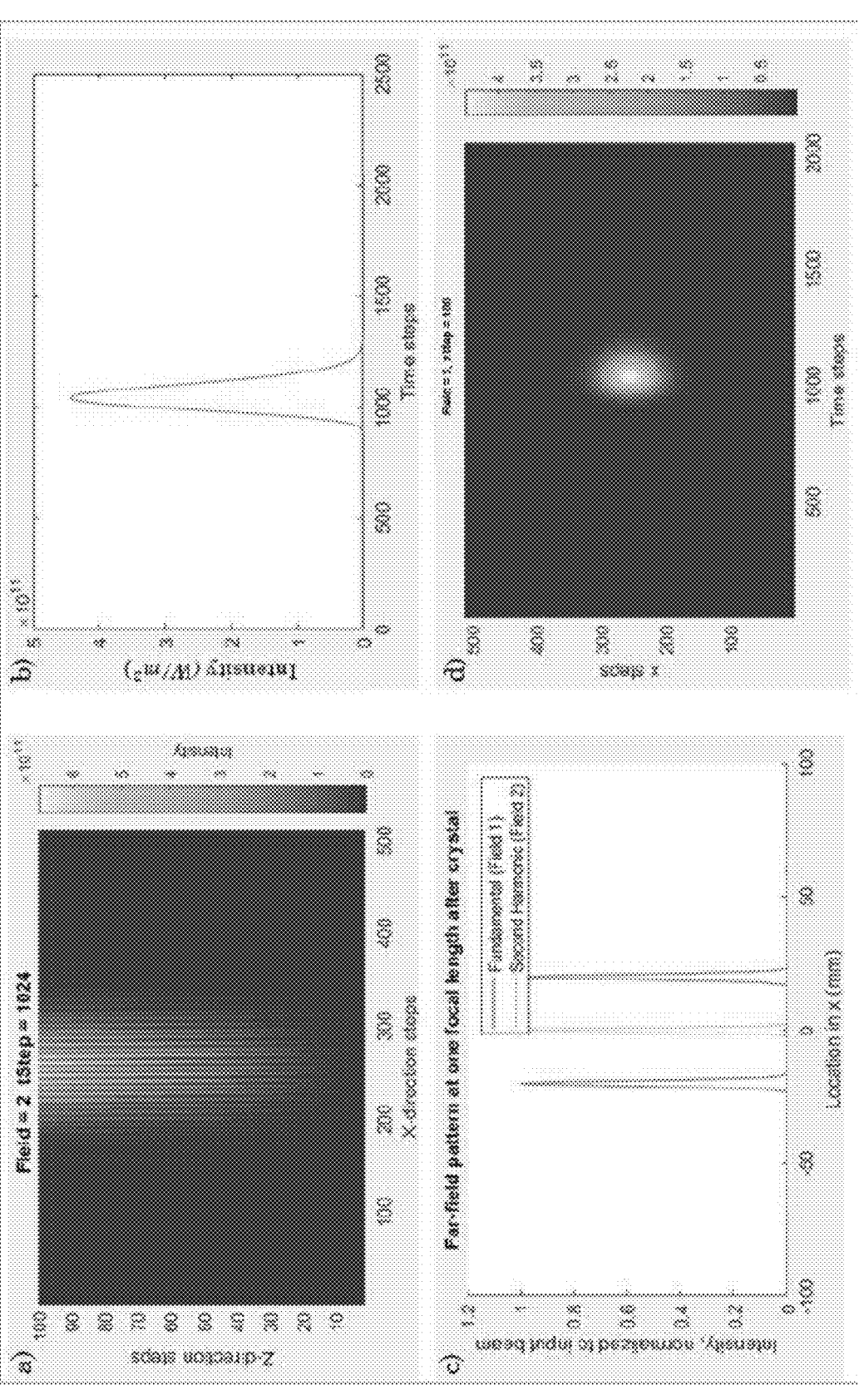
FIGS. 7A and 7B illustrate the results of nonlinear mixing and shaping of temporal profiles in accordance with embodiments of the invention.
Figure 7B:
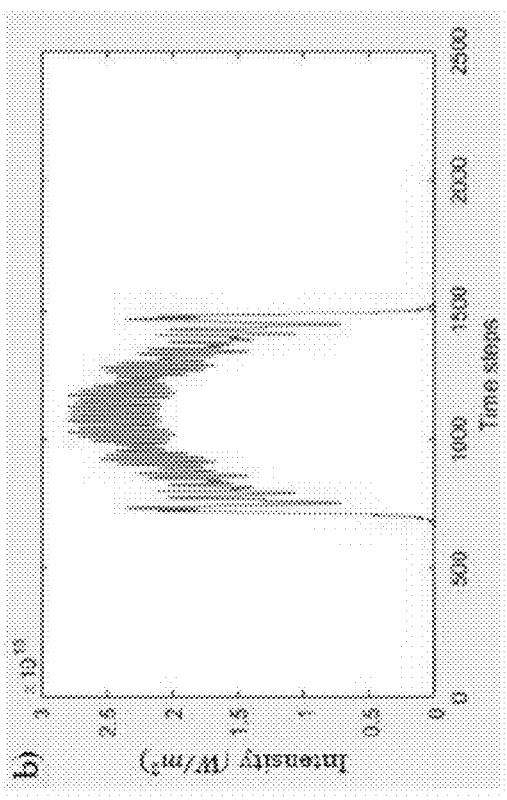
Figure 7B:
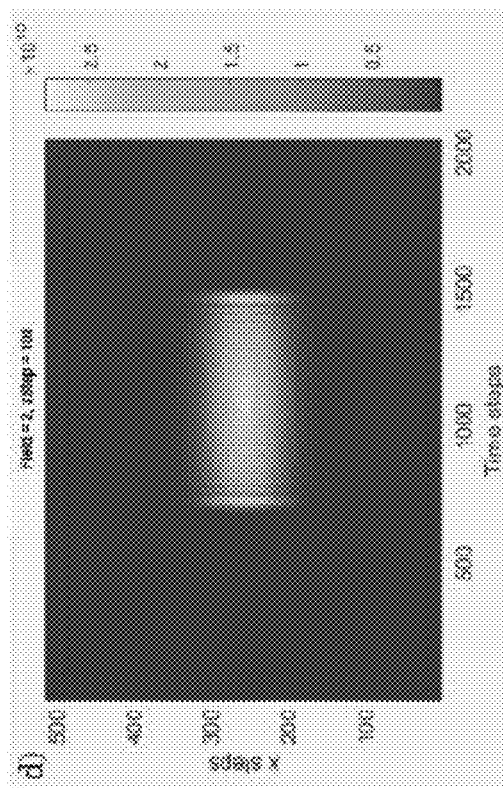
Figure 7B:
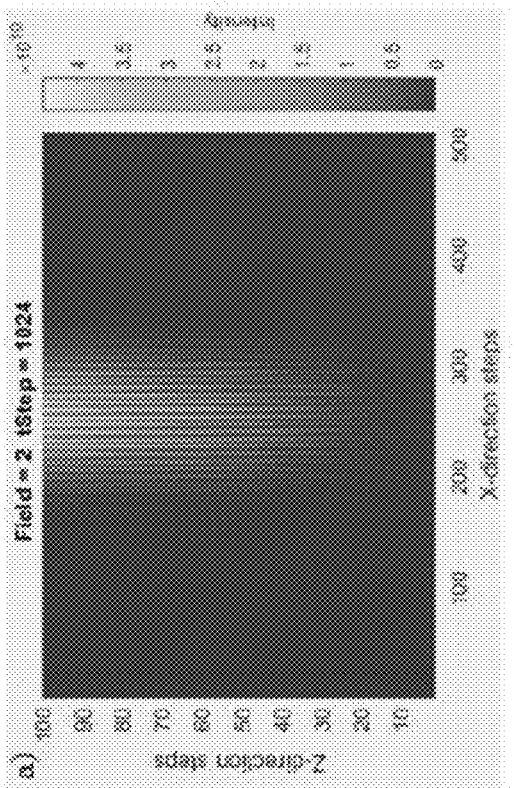
Figure 7B:
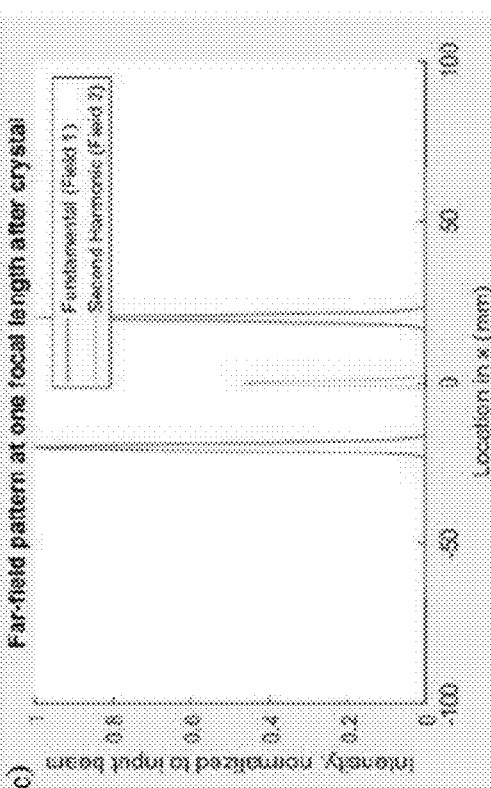

FIGS. 7A and 7B illustrate the results of nonlinear mixing and shaping of temporal profiles in accordance with embodiments of the invention. SOD and TOD values were added to each input pulse, and the input pulses were also offset 20 mm from the center of the lens. The top left plot visualizes how optical pulses interact within the crystal. The top right plot represents the time-intensity profile of the generated pulse. The bottom left plot represents the far field pattern, showing how output pulses are emitted out of the nonlinear crystal. The bottom right plot represents light propagation across all time through the transverse axis (the x-plane). As illustrated in FIG. 7A, the time-intensity profile of the generated pulse was shaped to be the desired triangular shape, whereas the time-intensity profile of the generated pulse was shaped to be the desired square shape shown in FIG. 7B.

Although specific methods of temporal shaping of optical pulses through nonlinear mixing are discussed above, many different methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system for shaping temporal and amplitude profiles of optical pulses, the system comprising:
  at least two laser emitters, each emitter configured to generate at least two input optical pulses;
  a pulse-shaping device configured to apply dispersions of different orders on each of the at least two input pulses; and
  a nonlinear crystal where the at least two input pulses applied with dispersions combine to emit an output optical pulse having an angular frequency that is the sum of the angular frequencies of the at least two input pulses.

2. The system of claim 1, wherein the laser emitter is an Ytterbium-based laser with a 4 nm full width at half maximum spectral bandwidth.

3. The system of claim 1, wherein the laser emitter is a photoinjector-based x-ray free electron laser (XFEL) configured to generate electron beams by upconverting ultraviolet (UV) optical lasers using a photoelectric effect.

4. The system of claim 1, wherein the input optical pulses have a flat-top profile in time and space.

5. The system of claim 1, wherein the orders of dispersions applied to the input optical pulses comprise second order dispersions (SODs) and third order dispersions (TODs).

6. The system of claim 1, wherein the pulse-shaping device comprises a grating compressor and stretcher matched to each other.

7. The system of claim 6, wherein both the compressor and stretcher comprise a single 1600 lines/mm grating set at a 51.4° incidence creating an effective grating separation of 384 mm.

8. The system of claim 6, wherein the pulse-shaping device further comprises a chirped volume Bragg grating (CVBG) system.

9. The system of claim 8, wherein the CVBG imparts ±24.75 ps$^2$ SOD and negligible TOD to the input optical pulses.

10. The system of claim 8, wherein the CVBG is a transparent optical material comprising a plurality of layers of grating of increasing thickness, wherein each layer of grating functions as a Bragg reflector for a separate wavelength.

11. The system of claim 5, wherein the SODs are applied by reflecting the various spectral components of the input optical pulses at different depths.

12. The system of claim 1, wherein the nonlinear crystal is a type I isotropic crystal.

13. The system of claim 1, wherein the nonlinear crystal is a β-barium borate (BBO) crystal having a length of 2 mm.

14. The system of claim 1, wherein the input optical pulses enter the nonlinear crystal at a crossing angle of 1.5°.

15. The system of claim 1, wherein the output optical pulse has an angular frequency that is the difference of the angular frequencies of the at least two input pulses.

16. The system of claim 1, further comprising a piano-convex cylindrical lens configured to correct the spatial ellipticity of the output optical pulse.

17. The system of claim 1, further comprising a set of spectral filters to filter the output optical pulse across the entire spectral range of the output optical pulse.

18. A method for shaping temporal and amplitude profiles of optical pulses, the method comprising:
  generating at least two input optical pulses;
  applying dispersions of different orders on each of the at least two input pulses;
  combining the at least two input pulses at a nonlinear crystal, where each of the at least two input pulses enter the nonlinear crystal at designated angles such that the angular frequencies of the at least two input pulses are summed; and
  emitting an output optical pulse of a desired temporal shape and amplitude profile from the nonlinear crystal.

19. The method of claim 18, wherein the at least two input optical pulses are lasers generated using Ytterbium-based laser emitters with a 4 nm full width at half maximum spectral bandwidth.

20. The method of claim 18, wherein the at least two input optical pulses are laser generated by a photoinjector-based x-ray free electron laser (XFEL) configured to generate electron beams by upconverting ultraviolet (UV) optical lasers using a photoelectric effect.

21. The method of claim 18, wherein the input optical pulses have a flat-top profile in time and space.

22. The method of claim 18, wherein the orders of dispersions applied to the input optical pulses comprise second order dispersions (SODs) and third order dispersions (TODs).

23. The method of claim 18, wherein the dispersions are applied using a pulse-shaping device comprising a grating compressor and stretcher matched to each other.

24. The method of claim 23, wherein both the compressor and stretcher comprise a single 1600 lines/mm grating set at a 51.4° incidence creating an effective grating separation of 384 mm.

25. The method of claim 23, wherein the pulse-shaping device further comprises a chirped volume Bragg grating (CVBG) system.

26. The method of claim 25, wherein the CVBG imparts ±24.75 ps$^2$ SOD and negligible TOD to the input optical pulses.

27. The method of claim 25, wherein the CVBG is a transparent optical material comprising a plurality of layers of grating of increasing thickness, wherein each layer of grating functions as a Bragg reflector for a separate wavelength.

28. The method of claim 22, wherein the SODs are applied by reflecting the various spectral components of the input optical pulses at different depths.

29. The method of claim 18, wherein the nonlinear crystal is a type I isotropic crystal.

30. The method of claim 18, wherein the nonlinear crystal is a β-barium borate (BBO) crystal having a length of 2 mm.

31. The method of claim 18, wherein the input optical pulses enter the nonlinear crystal at a crossing angle of 1.5°.

32. The method of claim 18, wherein the output optical pulse has an angular frequency that is the difference of the angular frequencies of the at least two input pulses.

33. The method of claim 18, further comprising correcting the spatial ellipticity of the output optical pulse using a piano-convex cylindrical lens.

34. The method of claim 18, further comprising filtering the output optical pulse across the entire spectral range of the output optical pulse using a set of spectral filters.

\* \* \* \* \*